(12) United States Patent
Polcha, Jr. et al.

(10) Patent No.: US 12,715,511 B2
(45) Date of Patent: Aug. 25, 2026

(54) ACTIVE CAMBERING SYSTEM CONTROLLED BY INPUT DERIVED FROM AN ELECTRONICALLY CONTROLLED LIMITED-SLIP DIFFERENTIAL

(71) Applicants: Michael Patrick Polcha, Jr., Lovettsville, VA (US); Thompson James Butz, Adamstown, MD (US)

(72) Inventors: Michael Patrick Polcha, Jr., Lovettsville, VA (US); Thompson James Butz, Adamstown, MD (US)

( * ) Notice: Subject to any disclaimer, the term of this patent is extended or adjusted under 35 U.S.C. 154(b) by 0 days.

(21) Appl. No.: 19/096,641

(22) Filed: Mar. 31, 2025

(65) Prior Publication Data

US 2025/0304169 A1 Oct. 2, 2025

Related U.S. Application Data

(60) Provisional application No. 63/731,091, filed on Apr. 1, 2024.

(51) Int. Cl.
*B62D 17/00* (2006.01)
*B60G 3/26* (2006.01)
(Continued)

(52) U.S. Cl.
CPC .............. *B62D 17/00* (2013.01); *B60G 3/26* (2013.01); *B60W 10/16* (2013.01); *B60W 10/22* (2013.01); *B60W 30/02* (2013.01); *G06V 20/588* (2022.01); *B60G 2200/46* (2013.01); *B60G 2200/462* (2013.01); *B60G 2200/464* (2013.01); *B60G 2204/62* (2013.01); *B60G 2400/41* (2013.01);
(Continued)

(58) Field of Classification Search
CPC ...... B62D 17/00; B60G 3/26; B60G 2200/46; B60G 2200/462; B60G 2200/464; B60G 2204/62; B60G 2400/41; B60G 2400/82; B60G 2400/821; B60G 2400/84; B60G 2401/14; B60G 2500/00; B60G 2600/182; B60G 2800/91; B60G 2200/4622; B60G 2401/142; B60G 17/0165; B60W 10/16; B60W 10/22; B60W 30/02; B60W 2552/00; B60W 2710/12; B60W 2710/22; G06V 20/588; G06V 10/774; G07C 5/02
See application file for complete search history.

(56) References Cited

U.S. PATENT DOCUMENTS 5,557,525 A * 9/1996 Miichi .............. B60G 17/0182 706/900
11,866,032 B2 1/2024 Mashrouteh

* cited by examiner

*Primary Examiner* — Xiao En Mo
(74) *Attorney, Agent, or Firm* — Doster Greene, LLC

(57) ABSTRACT

A vehicle control system according to various embodiments can include a control unit that receives data from a plurality of sensors which monitors an electronic limited slip differential mounted to a vehicle and detects road conditions. A prediction module executed by a processor predicts, based on electronic limited slip differential data and road condition data received by the control unit, a wheel alignment adjustment for the road conditions that the vehicle approaches and encounters along a road and generates a control signal based on the predicted wheel alignment adjustment. A wheel alignment adjustment mechanism, connected to a wheel mounted to the vehicle, automatically adjusts the wheel alignment for the wheel in response to the control signal such that at least one of a camber angle, a toe angle, and a caster angle for the wheel is adjusted as the vehicle travels across varying road conditions.

20 Claims, 5 Drawing Sheets

100

110 AWD / 4WD
ECU ACS eLSD ACS
ECU
ACS eLSD ACS
Wheel 140
150a 150b 150c 150d 130a 130b 130c 130d 160a 160b 120a 120b 170

(51) Int. Cl.

| | |
|---|---|
| ***B60W 10/16*** | (2012.01) |
| ***B60W 10/22*** | (2006.01) |
| ***B60W 30/02*** | (2012.01) |
| ***G06V 20/56*** | (2022.01) |
| *G06V 10/774* | (2022.01) |
| *G07C 5/02* | (2006.01) |

(52) U.S. Cl.

CPC .... *B60G 2400/82* (2013.01); *B60G 2400/821* (2013.01); *B60G 2400/84* (2013.01); *B60G 2401/14* (2013.01); *B60G 2500/00* (2013.01); *B60G 2600/182* (2013.01); *B60G 2800/91* (2013.01); *B60W 2552/00* (2020.02); *B60W 2710/12* (2013.01); *B60W 2710/22* (2013.01); *G06V 10/774* (2022.01); *G07C 5/02* (2013.01)

500

ACTIVE CAMBERING SYSTEM CONTROLLED BY INPUT DERIVED FROM AN ELECTRONICALLY CONTROLLED LIMITED-SLIP DIFFERENTIAL

CROSS-REFERENCE TO RELATED APPLICATION

This Patent Application claims priority to U.S. Provisional Patent Application No. 63/731,091, filed on Apr. 1, 2024. The disclosure of the prior Application is considered part of and is incorporated by reference into this Patent Application.

FIELD OF THE INVENTION

The present disclosure relates to automotive suspension systems and more particularly to systems and methods for selectively adjusting camber and toe angles of one or more wheels of a vehicle.

BACKGROUND

In the vehicle sector, wheel alignment refers to an adjustment of a vehicle's suspension—the system that connects a vehicle to its wheels. The primary functions of the suspension system in a vehicle include ensuring the comfort of passengers by absorbing and dampening shock, evenly supporting the weight of the vehicle (including the frame, engine, and body), and, improving the vehicle control by maintaining the proper steer and camber angles relative to the road surface, as well as maximizing the contact between the tires and the road surface while maneuvering.

The key to proper wheel alignment is adjusting the angles of the tires which affects how they make contact with the road. The parameters of the suspension system that have a large effect on a vehicle's stability include camber, toe, and caster. These parameters are an integral part of the kinematics of the suspension system, substantially influencing the motion dynamics of the vehicle. Therefore, the correct setting of such parameters of the wheel alignment defines an essential requirement for safety purposes.

Camber is the angle of the tire with respect to the vertical axis of the vehicle as viewed from the front side. The top of the tire leaning inward, toward the center of the car, is a negative camber and the top of the tire leaning outward is called as positive camber. Too much inward or outward tilt, (i.e., negative camber or positive camber, respectively) indicates improper alignment and will need to be adjusted.

The toe angle is the measure of how far inward or outward the leading edge of the tire is facing, when viewed from the top and determines how the car reacts to steering inputs as well as the tire wear. When the car has a toe-in during acceleration the thrust force will tend to bring the wheels back into straight line but it will have drastic effects during turns and braking. When toe-out is present, during acceleration the thrust force will try to increase the toe-out which has a greater influence on the vehicles' stability.

The caster angle helps balance steering, stability, and cornering. Specifically, it is the angle of the steering axis when viewed from the side of the vehicle. If there is positive caster, the steering axis will tilt toward the driver. Negative caster, on the other hand, means the steering axis tilts toward the front of the vehicle.

The alignment of a vehicle's wheels is performed primarily by adjusting these parameters. However, in vehicle dynamics, there is always a compromise between comfort and dynamic properties of the suspension system. In a car suspension system, the "compromise" refers to finding the balance between achieving a comfortable ride quality (absorbing bumps) and optimal road holding/handling (maintaining stability during turns), which are at odds with each other. Prioritizing one aspect too much can negatively impact the other. Therefore, tuning of suspensions involves finding the right compromise.

Thus, there is a need for a solution that utilizes electronic controls to perform wheel alignment by varying these parameters in an adaptive manner such that the dynamic characteristics of the vehicle can be varied on a real-time basis. There is also a need for a solution that enables wheel alignment to be monitored and varied on a vehicle, without the need for attaching an additional frame to the vehicle. There is a further need for a solution that enables an active suspension system that is capable of using the disturbances from the road condition or terrain while driving as input to the electronic control unit.

SUMMARY

Given the aforementioned deficiencies, there is a need for a system and method that automates and controls camber and toe angle of a vehicle.

Under certain circumstances, the disclosure relates to a system and method that provides wheel alignment monitoring and wheel alignment control and adjustment.

In an embodiment, a system and method provides an active suspension system that controls the suspension system through an electronic slip differential (eLSD) and telescoping actuators which optimizes the camber and toe angle of the wheel dynamically to improve traction and maneuverability.

Another embodiment provides a system and method of an electronic control system to control a suspension system of a vehicle to improve the vehicle dynamics characteristics.

In a further embodiment, a suspension system is configured to perform according to the dynamic road conditions and give better handling on a real-time basis.

In an embodiment, an active suspension system is configured to use the disturbances from the road conditions and terrains as input to an eLSD, an electronic control unit (ECU), and an active cambering system (ACS).

In various embodiments, a vehicle control system according to various embodiments may include a control unit that receives data from a plurality of sensors which monitors an eLSD mounted to a vehicle and detects road conditions. A prediction module executed by a processor predicts, based on the eLSD data and road condition data received by the control unit, a wheel alignment adjustment for the road conditions that the vehicle approaches and encounters along a road and generates a control signal based on the predicted wheel alignment adjustment. A wheel alignment adjustment mechanism, connected to a wheel mounted to the vehicle, automatically adjusts the wheel alignment for the wheel in response to the control signal such that at least one of a camber angle, a toe angle, and a caster angle for the wheel is adjusted as the vehicle travels across varying road conditions.

DETAILED DESCRIPTION

In general, described herein are systems, and methods for monitoring and adjusting wheel alignment. A system may include an apparatus, device, or assembly and may include hardware, software, and firmware. Although the various components of the system may be described separately in this disclosure, it is to be understood that, unless the context requires otherwise, any of these components or subsystems may be used in combination and may form an assembly for use in monitoring and/or adjusting wheel alignment.

As used herein, wheel alignment also refers to wheel alignment and position and includes alignment angle, including any one or more of camber, toe, and caster.

According to the present disclosure, a vehicle may include a wheel alignment control (WAC) system that may be used to dynamically monitor wheel alignment of one or more wheels. The WAC system may be used to sense, record, transmit and analyze wheel alignment including camber, toe, and caster angle. In embodiments, the WAC system may use inputs based on the driving operating conditions to adjust or maintain correct wheel alignment, including employing a closed-loop feedback system, to increase tire performance and/or increase tire life.

Figures 1, 2:
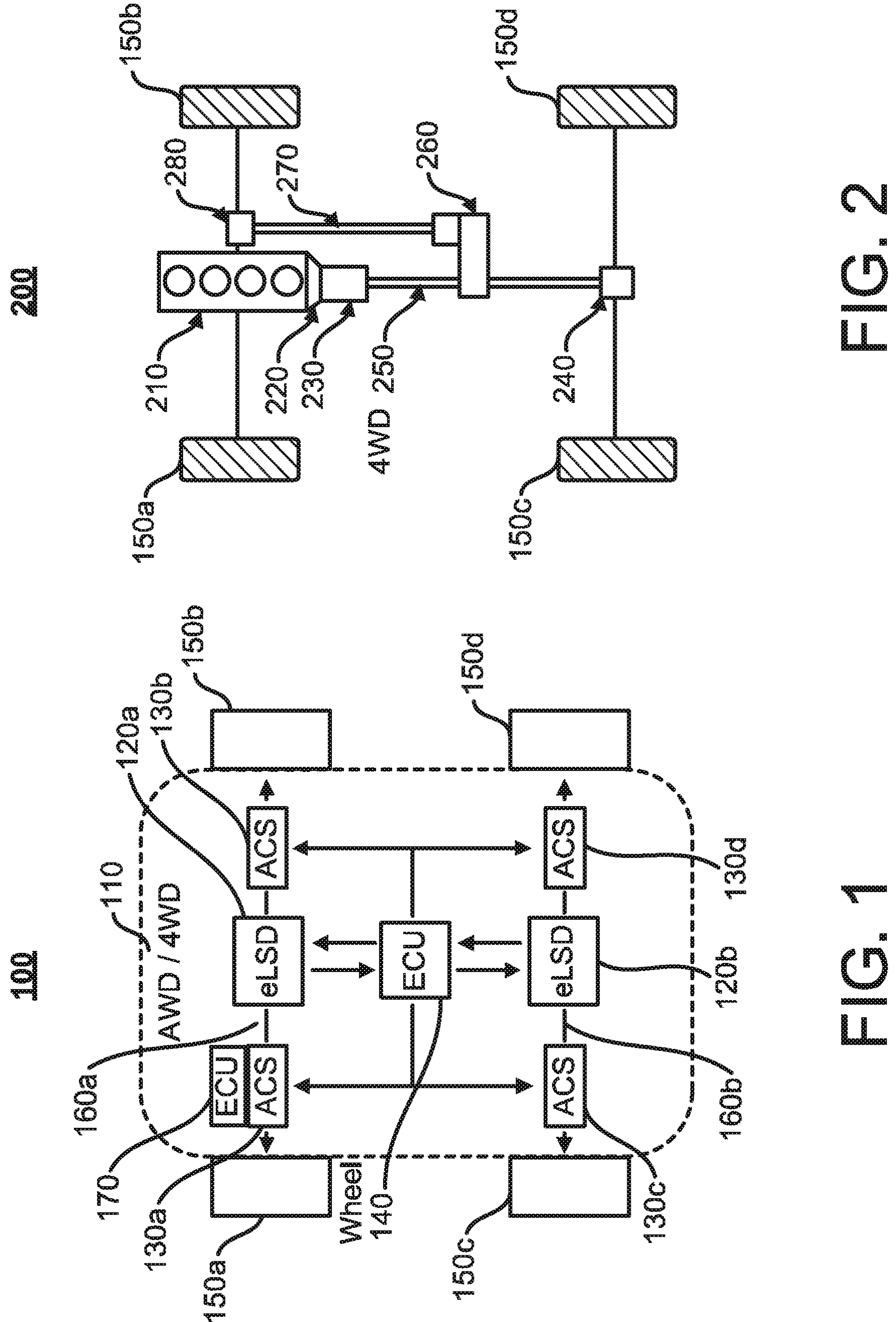
FIG. 1 is a functional block diagram of an example of a wheel alignment control (WAC) system, which is applicable to an all-wheel drive (AWD) vehicle or a four-wheel-drive (4WD) vehicle, according to embodiments of the present disclosure.
FIG. 2 illustrates the structure of a typical 4WD transmission in which the WAC system 110 of FIG. 1 may be employed according to the present disclosure.

FIG. 1 illustrates a functional block diagram of one example of the WAC system 110 of an automotive vehicle 100 according to the present disclosure. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

Specifically, FIG. 1 is an example WAC system 110, as applied to an AWD vehicle or a 4WD vehicle, according to embodiments of the present disclosure. When employed in either an AWD or 4WD vehicle, both the AWD and the 4WD connect to each of the four wheels 150*a*, 150*b*, 150*c*, 150*d* of the vehicle 100 and distributes power to all four wheels. An AWD vehicle sends power to either the front axle or rear axle in normal driving conditions. If the vehicle detects a lack of traction it will engage to send power to all four wheels. A 4WD vehicle includes a selectable switch to choose two-wheel drive mode or four-wheel drive depending on road conditions.

FIG. 1 describes a control array for the WAC system 110. Sensor information collected at each wheel may be transmitted by the electronically controlled limited-slip differential (eLSD) and sent to a central computer (e.g., an electronic control unit (ECU) also known as an electronic control module) from which the information is converted to a command transmitted accordingly to each wheel's ACS. In the particular embodiment of FIG. 1, the WAC system 110 may include a front eLSD 120*a*, a rear eLSD 120*b*, a front-left wheel active cambering system (ACS) 130*a*, a front-right wheel ACS 130*b*, a rear-left wheel ACS 130*b*, a rear-right wheel ACS 130*d*, and an ECU 140. The ACSs 130*a*, 130*b*, 130*c*, 130*d* are associated with the front-left wheel 150*a*, the front-right wheel 150*b*, the rear-left wheel 150*c*, and the rear-right wheel 150*d*, respectively, of the vehicle 100 to measure the vehicle's wheel alignment parameters.

FIG. 2 illustrates the structure of a typical 4WD transmission 200 in which the WAC system 110 may be employed according to the present disclosure. In general, the structure of a typical 4WD transmission 200 may include an engine 210, a clutch/torque converter 220, a transmission (gearbox) 230, a rear-differential 240, a rear shaft 250, a transfer case 260, a front shaft 270, and a front differential 280.

The 4WD transmission 200 is configured to deliver power from the engine 210 to all four wheels 150*a*, 150*b*, 150*c*, 150*d*, providing enhanced traction and control, especially on rough or slippery terrain. The engine 210 may be fuel injected to generate power. The engine 210 may be controlled by the ECU 140. In some embodiments, the location of the ECU 140 may be varied from what is shown in the figures. For example, the present disclosure also supports the use of wheel or axle specific ECUs synced to a central ECU.

In manual 4WD systems, the clutch 220 connects and disconnects the engine 210 from the transmission 230 to allow for smooth gear shifts. In automatic transmissions, a torque converter replaces the clutch, performing a similar function using hydraulic fluid.

The transmission (or gearbox) 230 controls the power output from the engine 210 by selecting different gears. Lower gears provide more torque for off-road driving, while higher gears allow for higher speeds on highways. Once the appropriate gear is selected, the power is transmitted to the transfer case 260.

The transfer case 260 is responsible for distributing power between the front shaft 270 and rear shaft 250. The transfer case 260 has multiple modes: the 2WD mode—sends power only to the rear wheels for normal driving; the 4WD High—distributes power equally to all four wheels for improved tractions at higher speeds; and 4WD Low—provides maximum torque for off-road or slippery conditions by using lower gear ratios. The transfer case 260 connects to the rear shaft 250 and front shaft 270, distributing power between both axles.

The rear shaft 250 (or driveshaft) is a rotating shaft that carries power from the transfer case 260 to the rear differential 240. The rear shaft 250 transmits the torque efficiently to the rear wheels 150*c*, 150*d*.

The rear differential 240 receives power from the rear shaft 250 and splits it between the two rear wheels 150*c*, 150*d*. The rear differential 240 allows the wheels 150*c*, 150*d* to rotate at different speeds when turning, preventing wheel slippage, and improving stability. In 4WD systems, some vehicles have locking differentials, ensuring both wheels spin at the same speed for off-road traction.

When 4WD mode is engaged, the front shaft 270 receives power from the transfer case 260 and sends it forward to the front differential 280. This ensures the front wheels 150*a*, 150*b* also receive power, improving traction on difficult terrain.

The front differential 280 functions similarly to the rear differential 240, allowing the front wheels 150*a*, 150*b* to rotate at different speeds during turns. Some 4WD systems may have limited-slip or locking front differentials to improve grip in extreme conditions.

Through the use of WAC system 110 in FIG. 1, the transmission system 200 may be configured to ensure that all four wheels receive the right amount of power for different driving conditions, enhancing traction, control, and off-road capability.

The WAC system 110 provides wheel alignment monitoring, control, and adjustment. The system and methods may allow for improved handling performance, maneuverability, safety, and tire life. In general, the wheel alignment settings for each wheel 150*a*, 150*b*, 150*c*, 150*d* may be jointly or independently controlled by a single apparatus or a plurality of apparatuses. For example, it may be possible to have different wheel alignment settings between front and rear wheels, and/or between left and right wheels, and/or between steered and non-steered wheels, and/or between driven and non-driven wheels.

In various embodiments, the systems described herein include apparatuses for controlling wheel alignment of a vehicle having a suspension. In an embodiment, the WAC system 110 may be an active suspension system which is configured to use the disturbances from the road conditions and terrains as input to an eLSD, an ECU, and an ACS. For example, in various embodiments, the WAC system 110 for controlling wheel alignment systems may include a combination of an eLSD and an ACS that operate together to control the camber and toe angle.

In FIG. 1, the front-left wheel ACS 130*a*, the front-right wheel ACS 130*b*, the rear-left wheel ACS 130*c*, and the rear-right wheel ACS 130*d* may be controlled to adjust the alignment of respective individual wheels 150*a*, 150*b*, 150*c*, 150*d* independently of each other. In another example, the wheel alignment settings for each wheel may be jointly controlled by a single apparatus or a plurality of apparatuses.

In the example of FIG. 1, the front eLSD 120*a* is disposed on a front axle 160*a* of the vehicle's frame between the pair of front ACSs 130*a*, 130*b*, and the rear eLSD 120*b* is disposed on a rear axle 160*b* between the pair of rear ACSs 130*c*, 130*d*. This embodiment is merely exemplary. In an alternative, a single eLSD and a single ACS may be disposed on an axle of the vehicle. In another embodiment, one or two of the eLSDs may be positioned on the drive shaft 250 such that it is orthogonal to one or more ACS positioned on an axle 160*a*, 160*b* of the vehicle.

In embodiments, the system and method is directed specifically to the usage of information or data that may be in any analog or digital format derived from any or all sensors used to enable and/or control a vehicle's ACS and eLSD to manipulate, influence and/or directly control the camber and/or toe angle of said vehicle's individual wheels.

As described herein, a system for monitoring and controlling the alignment of one or more wheels of a vehicle may include a control unit or processing unit (e.g., an ECU 140) comprising a plurality of sensors coupled to the wheel and/or frame of the vehicle, and a processor adapted to receive data from the wheel and body to calculate one or more of camber, toe, and caster based on changes in the wheel data relative to the body data. The sensors may include, for example, position, orientation, and/or inclination sensors, such as (but not limited to) accelerometers, gyroscopes, and magnetometers.

The WAC system may be used to sense, record, transmit and analyze wheel alignment including camber, toe, and caster angle. The system described herein may include one or more control units or processing units to receive sensed data from any one or more of an accelerometer (for measuring toe and/or camber and/or caster), a magnetometer (for sensing toe and/or camber and/or caster), etc. Any of the systems, apparatuses, or devices described here may be configured to include a controller area network (CAN) transceivers (e.g., communication circuitry) and/or may be configured to use CAN protocols to allow any microcontrollers and devices (e.g., sensor module, magnet module, etc.) to communicate with each other (and/or with a control unit and/or a processing unit) or other applications without a host computer.

Referring to FIGS. 1-2, the front differential 280, the rear differential 240 or both in FIG. 2 may be an electronically controlled limited-slip differential (eLSD) (e.g., a front eLSD 120*a*, a rear eLSD 120*b* as shown in FIG. 1) that uses software to analyze the data from numerous vehicle sensors to determine the optimum torque corrections, as described in "eLSD: What is Electronic Limited Slip Differential?", available at https://carbiketech.com/elsd/, which is incorporated herein by reference. The CLSDs 120*a*, 120*b* may operate by electronically monitoring wheel spin and automatically applying braking force to the slipping wheel, effectively transferring power to the wheel with more traction, enhancing grip and stability, particularly in slippery or off-road conditions. The eLSDs 120*a*, 120*b* intelligently distribute torque between the respective wheels based on which one has the most grip at any given time, allowing the vehicle to maintain traction even when one wheel loses grip on the road surface.

The eLSDs 120*a*, 120*b* system ensures that each respective wheel is receiving sufficient torque by use of an electronic control unit, which may be microcomputers or the vehicle's main computer. The system electronically monitors input from various wheel sensors and, in the event of slippage, transfers extra torque to the wheel or wheels with the most traction.

In the exemplary embodiments of FIGS. 1-2, the eLSDs 120*a*, 120*b* in a 4WD system with an ECU 140 operates by constantly monitoring wheel speed sensors and, when it detects one wheel slipping significantly, electronically applies braking force to that wheel, effectively transferring power to the wheel with more traction, thus enhancing overall traction and stability in slippery conditions. The ECU 140 analyzes data from various sensors to determine the optimal torque distribution between the wheels based on real-time driving situations. Wheel speed sensors constantly monitor the rotation speed of each wheel. Thus, in one embodiment, the WAC system 110 may perform wheel alignment while driving (moving). In another embodiment, wheel alignment is performed by the WAC system 110 while the vehicle is stopped (stationary).

The ECU 140 analyzes the sensor data to identify when one wheel is spinning significantly faster than the others, indicating a loss of traction. When slip is detected, the ECU 140 applies braking force to the slipping wheel using the vehicle's braking system, effectively transferring power to the wheel with better grip.

The WAC system 110 continuously adjusts braking pressure based on the driving situation, allowing for smooth and responsive traction control. The eLSDs 120*a*, 120*b* help maintain control in slippery conditions by distributing power to the wheels with the most grip. The eLSDs 120*a*, 120*b* also provide better cornering stability by managing torque distribution between the wheels during turns. In addition, the eLSDs 120*a*, 120*b* minimizes wheel spin, which can lead to tire wear and decreased acceleration.

In the embodiments, one or both of the eLSDs 120*a*, 120*b* may use various sensors to monitor wheel speed, torque distribution, and traction conditions, allowing the system to dynamically adjust power delivery for better stability and control.

Wheel speed sensors may be used to measure the rotational speed of each wheel to detect differences in wheel slip. The wheel speed sensors can be used by the eLSD and anti-lock braking system to determine if power needs to be redirected. The wheel speed sensors may be, for example, hall effect sensors and magneto-resistive sensors.

Torque sensors may be used to measure the amount of torque applied to the wheels. The torque sensors help the eLSDs 120*a*, 120*b* determine how much power to transfer to a slipping or gripping wheel. The torque sensors may be, for example, strain gauge sensors or optical torque sensors.

Throttle position sensor (TPS) may be used to monitor the position of the throttle valve (or butterfly) and transmit this information to the ECU, which then uses it to adjust fuel injection and ignition timing for optimal engine performance.

Steering angle sensors may be used to monitor steering wheel position and movement to predict how the vehicle should distribute torque. The steering angle sensors help improve cornering stability by adjusting power delivery. The steering angle sensors may be, for example, optical encoders or resistive potentiometers.

Yaw rate sensor (gyroscope sensor) may be used to measure the vehicle's rotational movement (yaw) around its vertical axis. The yaw rate sensor helps detect oversteer or understeer and allows the eLSD(s) to apply corrections. The yaw rate sensors may be, for example, micro-electro-mechanical systems (MEMS) gyroscopes.

Lateral acceleration sensors (G-force sensors) may be used to detect side-to side movement of the vehicle. The lateral acceleration sensor works in conjunction with the Yaw sensor to prevent excessive lateral slip. The lateral acceleration sensors maybe, for example, (MEMS) accelerators.

Temperature sensors may be used to monitor the temperature of the differential fluid to prevent overheating. The temperature sensors ensures the eLSD clutch or hydraulic system operates efficiently. The temperature sensors maybe, for example, thermocouple sensors in negative temperature coefficient (NTC) thermistors.

Hall-effect sensors or magnetic reluctance sensors may be used to measure the difference in speed between the wheels on each side of the vehicle, which is crucial to understanding steering intensity in real time.

These exemplary sensors may work together such that the wheel speed sensors detect wheel slip; the torque sensors measures how much force is needed to correct it; steering angle, yaw, and lateral acceleration sensors assess vehicle dynamics to determine proper torque distribution; and the temperature sensors ensure the eLSD does not overheat under heavy use. The sensor data may be processed by the ECU or a vehicle stability control to dynamically adjust torque between the wheels for optimal traction and performance.

In various embodiments, the WAC system 110 for controlling wheel alignment systems may include a combination of an eLSD and an ACS that operate together to control the camber and toe angle. As discussed above, the eLSD may use many sources of sensor input for responding to traction discrepancies at each wheel.

One of the advantages of the system and method of the present disclosure is that the combination of the eLSD 120*a*, 120*b* and the ACS 130*a*, 130*b*, 130*c*, 130*d* operates together to control wheel alignment, such as the camber and toe angle. For example, in FIGS. 1-3, the same information that is sensed, collected, recorded, transmitted, and analyzed by the eLSDs 120*a*, 120*b*, either in whole or in part; sourced either dependently or independently, can be used to effectively enable and control one or more ACS 130*a*, 130*b*, 130*c*, 130*d* at each wheel. Thus, the system and method is relatively efficient and simple in terms of design and implementation. The system and method is capable of performing wheel alignment and adjustment so as to avoid the use of an additional equipment attached to or associated with the vehicle.

The control mechanism for the ACS(s) 130*a*, 130*b*, 130*b*, 130*c*, 130*d* may derive input from sensor information transmitted by an eLSD 120*a*, 120*b*. This enables the ACS(s) to quickly analyze terrain information such as, but not limited to, traction and turning margins and, in response, make corrections to the camber of each wheel, such that the terrain can be traversed at optimal speed.

Figure 3:
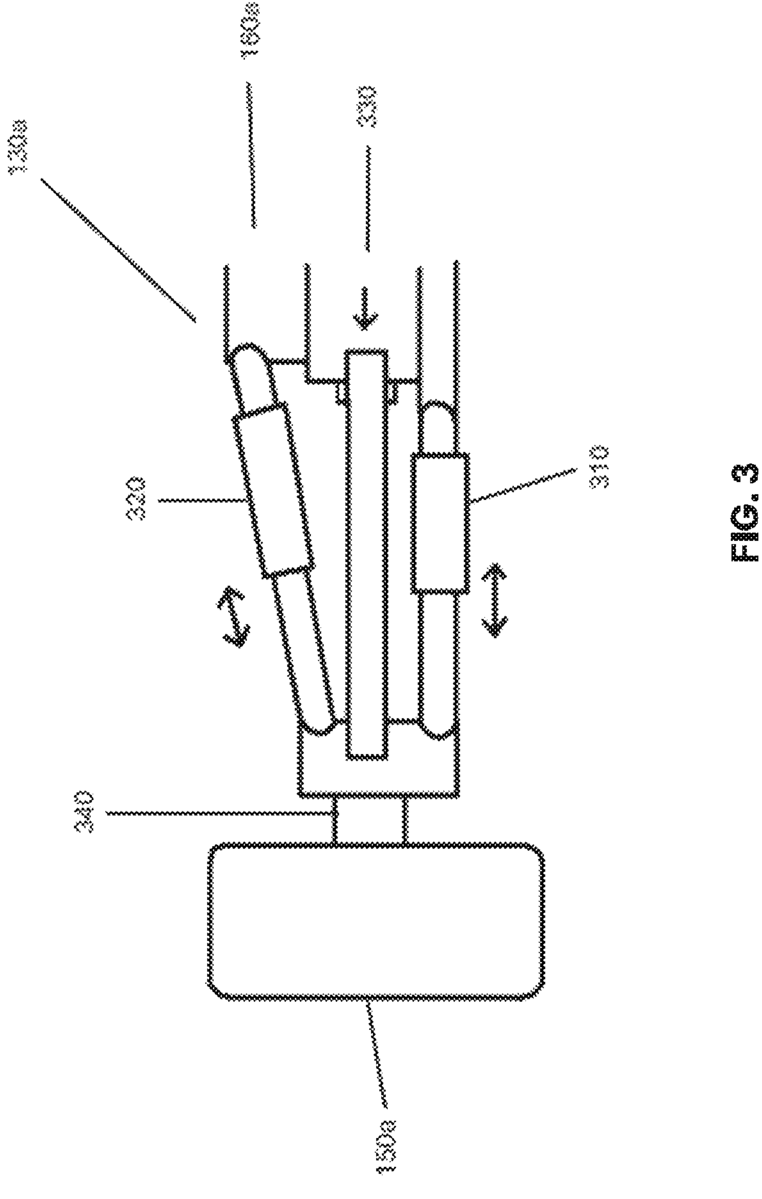
FIG. 3 is a partial view of a vehicle with a wheel having an automotive active cambering system (ACS) according to embodiments of the present disclosure.

FIG. 3 is a partial view of a vehicle with a front-left wheel 150*a* coupled to an ACS 130*a* according to embodiments of the present disclosure. While the example of front-left wheel 150*a* is shown, the present disclosure is also applicable to front-right wheel 150*b* and both of the rear wheels 150*c*, 150*d*. In various embodiments, the ACSs may operate substantially similar to the active suspension control (ASC) system described in Kavitha et al., "Active Camber and Toe Control Strategy for the Double Wishbone Suspension System" (2018), available at https://www.sciencedirect.com/science/article/pii/S1018363917302799 #b0070, the content and references of which are herein incorporated by reference in its entirety.

In the particular embodiment of FIG. 3, the ACS 130*a* may include two telescopic arms with actuators 310, 320 and a control arm 330 associated with, for example, front-left wheel 150*a*. The front-left wheel 150*a* is coupled to the vehicle via a steering knuckle 340 (referred to hereafter as "knuckle"). One end of the telescopic arms with actuators 310, 320 and the control arm 330 is connected to the knuckle 340 such that the control arm 330 and the other end connects to a front axle driveshaft 160*a* of the vehicle.

In the example of FIG. 3, the ACS 150*a* may be configured to couple to the front shaft 160*a*. The ACS 130*a* may be coupled to front-left wheel 150*a* and to drive the telescopic arms and actuators 310, 320 in a direction inward or outward with respect to the wheel to adjust the alignment of the vehicle. In embodiments, the ACS150*a* may include a controller, such as a PID (proportional-integral-derivative) controller, to control movement of the control arm 330 which in response controls movement of the telescopic arms and actuators 310, 320. In various embodiments, the ACS may comprise, for example, a single control arm, multiple control arms, a single actuator, and/or a multiple actuators of a single-link or multi-link suspension system, etc. The actuators may include a linear, mechanical/electro mechanical, hydraulic, pneumatic, and/or piezoelectric actuator.

For example, movement of the telescopic arms and actuators 310, 320 in one direction (e.g., inward) with respect to the wheel by the control arm 330 causes the front-left wheel 150*a* to move outward and increase the camber angle of the front-left wheel 150*a* to a positive camber angle. Movement of the telescopic arms and actuators 310, 320 in the opposite direction (e.g., outward) with respect to the wheel by the control arm 330 causes the front-left wheel 150*a* to move inward and decrease the camber angle of the front-left wheel 150*a* to a negative camber angle.

During operation of the ACS 130*a*, the telescopic arms with actuators 310, 320 may operate jointly or independently to pivot the wheel 150*a* via the knuckle 340 according to an axis determined by the control arm 330. In various exemplary embodiments, optical sensors, inertial measurement units (IMUs) and/or gyroscopes may be used to measure the lateral acceleration and velocity of the vehicle. In an embodiment, the gyroscopic sensors may be a component of the IMU. One or more IMUs (not shown) may be mounted on the knuckle 340 of the wheel 150*a* and/or attached to the vehicle at a location near the center of gravity of the vehicle. In other embodiments, a single sensor, or a plurality of sensors at different locations sensors may be attached to the vehicle.

A control unit or processor of the ACS may communicate (wired or wirelessly) with and receive information and sensor data, for example, from the eLSD(s), ECU, the IMU, and other sensors and electronic components to control the control arm 330 of the ACS 130*a* to adjust one or more wheel alignment parameters (e.g., camber, toe, and/or caster).

The ECU or a vehicle control system may control multiple actuators of the ACSs, using a multiple input, multiple output control technique such as a prediction module. The prediction module may predict a vehicle dynamics conditions (e.g., traction) and generate a control signal based on the vehicle dynamics conditions. When controlling the actuators using the prediction module, the ECU or vehicle control system may predict vehicle responses to numerous possible control actions for each actuator.

The ACSs may connect to each of the wheel for automatically adjusting the camber, toe, and/or caster angle in response to the control signal. The ACSs may use the two telescopic arms and actuators to adjust the camber and toe angle of a vehicular wheel, controlled either through closed-loop software or direct driver input. As discussed above, it may be possible to have different wheel alignment settings between front and rear wheels, and/or between left and right wheels, and/or between steered and non-steered wheels, and/or between driven and non-driven wheels. The prediction module may automatically determine optimal parameters, such as camber, toe, and caster, for the wheels, individually, in a pair, or a group.

In embodiments, the processor may execute the prediction module. The prediction module may be a software module executed by the processor to predict and compute wheel and/or vehicle responses to numerous possible parameters and conditions based on sensor input. For example, prediction module may receive current operating parameters, such as vehicle speed, wheel speed, lateral acceleration and velocity of the vehicle and road data from the various sensors. Then, based on the sensor input, the prediction module may calculate and derive an optimal wheel alignment for the camber, toe, and/or caster angle for each wheel.

In an embodiment, the WAC system 110 may be an active suspension system which may be configured to use the disturbances from the road conditions and terrains as input to the eLSD, the ECU, and the ACS. In various embodiments, a road data sensor may be attached to the vehicle to collect information about the road surface conditions, such as detecting slope, curvature, potholes, cracks, uneven pavement, or even weather-related hazards, allowing the car to adjust its wheel performance, driving behavior and/or provide real-time updates to the driver or a central system based on the data gathered. The road data sensor may include cameras, LiDAR (Light Detection and Ranging), radar, or specialized sensors designed to measure road surface irregularities.

In some embodiments, the WAC system 110 may use data from existing sensors on the vehicle to create virtual sensors that measure road conditions and improve car safety and performance. Signals from existing sensors in the vehicle, such as steering angle, wheel speed, wheel angle and engine torque, may be input into a machine learning algorithm to create virtual sensors. The virtual sensors can sense tire health, estimate the grip between the tire and the road and predict the risk of hydroplaning. The virtual sensors may generate two data layers: virtual surface data and virtual vehicle data. The virtual surface data may create a virtual replica of road segments and can understand road conditions (e.g., curvature) as well as how the surface will react to weather conditions such as snow and rain. The virtual vehicle data may create virtual replica of the vehicle chassis system, including tires and steering.

In a further embodiment, the WAC system 110 may use data from cameras mounted on the vehicle, such as the hood of the vehicle, and use artificial intelligence (AI) to analyze images of the road. The images can be uploaded to be inspected using AI that can identify, categorize, and train the algorithm to spot road conditions and faults.

In some embodiments, such as the virtual sensors and AI embodiments, the road data may be obtained from a network-connected server using a data transceiver of the vehicle 100. The data transceiver may be, for example, a cellular data transceiver configured to wirelessly communicate data from the vehicle 100 to the server by attaching communicatively to a base transceiver station. Data may be transmitted and received over a cellular wireless network using cellular communication protocols and standards for packet data transfer. The packetized data transmitted to the base transceiver station may then be routed through the internet to the server which receives, processes, stores, and distributes the road data. In embodiments, the WAC system 110 may wirelessly receive the road data to dynamically in real time or pre-emptively adjust the wheel alignment.

Referring to FIG. 1, each ACS may include an ACS electronic control unit (ECU) or control unit generally comprising a microcomputer. The example in FIG. 1 shows an ACS ECU 170 associated with ACS 130*a* and front-left wheel 150*a*. The ACS ECU 170 may include an input/output interface (I/O), memories (RAM, ROM), and a microprocessor (or processor) or a central processing unit (CPU). The input/output interface (I/O) of ACS ECU 170 may receive input information from vehicle switches and sensors, namely front-left, front-right, rear-left, and rear-right wheel speed sensors, and front-left, front-right, rear-left, and rear-right wheel speed IMUs. Front-left and front-right wheel speed sensors may be located at the respective front road wheels 150*a* and 150*b*, to sense front-left and front-right wheel speeds. Rear-left and rear-right wheel speed sensors may be located at the respective rear road wheels 150*c* and 150*d*, to sense rear-left and rear-right wheel speeds.

In embodiments, the system for monitoring the alignment of one or more wheels of a vehicle may include the IMU, comprising one or more sensors, coupled to the steering knuckle of the vehicle so as to move with a tread plane of the wheel; a body IMU, comprising a plurality of sensors, rigidly coupled to a frame of the vehicle; and a processor adapted to receive data from the wheel IMU and body IMU and to calculate one or more of camber, caster and toe based on changes in the wheel IMU data relative to the body IMU data.

In general, the IMU may refer generally to the one or more processors and position, orientation, and/or inclination sensors, such as (but not limited to) accelerometers, gyroscopes, and magnetometers. The term IMU may also be referred to as a control unit or a processing unit. For example, the systems described herein may include one or more processing units to receive sensed data from any one or more of an accelerometer (for measuring camber and/or caster), a magnetometer (for sensing toe and/or camber and/or caster), etc. In various embodiments, in any of these systems, the magnetometer may be part of an inertial sensor module (e.g., measurement unit, or IMU); the sensor module (e.g., wheel IMU) may include additional sensors, such as accelerometer, gyroscope, etc. For example, the system may include an accelerometer coupled to the one or more wheels.

Any of these systems may include an encoder coupled to the steering knuckle by a linkage of the ACS, in which the encoder may be configured to communicate with the processor. Any of the systems or apparatuses described herein may be configured to include CAN transceivers (e.g., communications circuitry) and/or may be configured to use CAN protocols to allow any of the microcontrollers and devices (e.g., a sensor module, a magnet module, etc.) to communicate with each other (and/or with a processing unit/IMU) or other applications without a host computer.

Any of the systems described herein may include a body sensor coupled (e.g., rigidly coupled) to the frame of the vehicle, wherein the processor may be further configured to receive data from the body sensor.

In FIG. 1, an electronic vehicle dynamics control unit (WAC ECU 140) generally comprises a microcomputer. For mutual communication via a two-way communication line, WAC ECU 140 may be electrically connected to ACS ECU 170. Additionally, for mutual communication via a data link (a two-way communication line), WAC ECU 140 may be electrically connected to eLSDs 120*a*, 120*b*. WAC ECU 140 may include an input/output interface (I/O), memories (RAM, ROM), and a microprocessor (or processor) or a central processing unit (CPU). The input/output interface (I/O) of WAC ECU 140 may receive input information from vehicle sensors, namely a yaw rate sensor and a steer angle sensor, and input information from ACS ECU 170, regarding wheel speeds, and information from the eLSDs 120*a*, 120*b*. The input/output interface (I/O) of WAC ECU 140 may also receive input information from ACS ECU 170 regarding variables of the four wheels detected by the IMUs. Further, WAC ECU 140 (processor or microprocessor) may be communicatively coupled to a memory for storing navigation data (e.g., a route), vehicle dynamics data (e.g., expected cornering forces), road data (e.g., received from the server) and wheel data (e.g., caster angles and/or camber angles). The processor may cooperate with a data transceiver to request and receive the road data. In a variant, the autonomous vehicle may collect and transmit new road data and vehicle location coordinates to the server.

A prediction module may be linked to or may be part of WAC ECU 140, ACS ECU 170, or a controller. The prediction module may be connected directly and/or indirectly with at least one sensor. Further, the prediction module may be configured and arranged to predict a vehicle dynamics conditions (e.g., traction) and generate a control signal based on the vehicle dynamics conditions. The prediction module may automatically determine optimal parameters, such as camber, toe, and caster, for the wheels, individually, in a pair, or a group.

When controlling the actuators using the prediction module, the WAC ECU 140 or vehicle control system may predict vehicle responses to numerous possible control actions for each actuator. The WAC ECU 140, in conjunction with the prediction module, may control each ACS 130*a*, 130*b*, 130*c*, 130*d* and each wheel 150*a*, 150*b*, 150*c*, 150*d* by outputting control signals to the actuators of the ASCs indicating their respective control actions. For example, the WAC ECU 140 may output control signals to the ACS indicating an optimal camber, toe, and caster.

Figure 4:
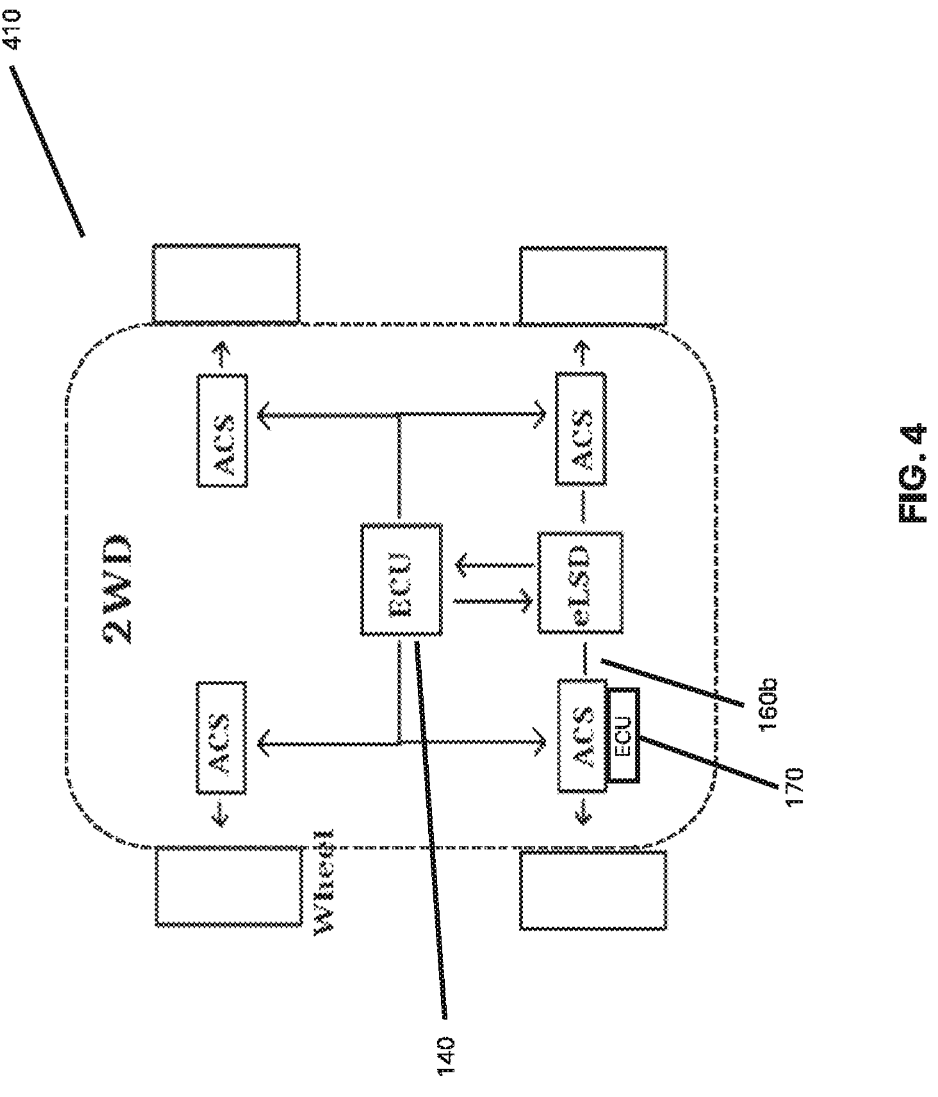
FIG. 4 is a functional block diagram of another example of a wheel alignment control WAC system, which is applicable to a two-wheel drive vehicle, according to embodiments of the present disclosure.

FIG. 4 illustrates an alternative embodiment of the WAC system design in comparison to FIG. 1. FIG. 4 illustrates an alternative WAC system design 410 applied to a front-wheel drive or rear-wheel drive array. In some embodiments, WAC 410 may also include the same or similar components and devices as those in WAC system 110 illustrated in FIG. 1, which will not be repeated herein for brevity. To the extent illustrated in FIG. 1, similar components in FIG. 4 are designated by similar reference numerals.

In FIG. 4, the WAC 410 may be applied to a two-wheel drive (2WD) vehicle wherein the engine power is directed solely to two wheels, either the front two or the rear two, allowing only those wheels to drive the car while the other two wheels freely rotate without power; this is referred to as either front-wheel drive (FWD) or rear-wheel drive (RWD) depending on which axle receives the power. For the two wheel drive vehicle, the output parameters are measured at two wheel locations, while for a four wheel drive or all-wheel drive vehicle the output parameters are measured at four wheel locations, using respective IMUs and transmitted to the respective ACSs.

In various embodiments, the wheel alignment may include at least two modes: a four-wheel drive mode (4WD) (which includes all-wheel drive mode) and a two-wheel drive (2WD) mode. The transfer case 260 may be operable in at least one four-wheel or all-wheel drive mode in which the transfer case 260 transmits rotary power to both the first and second axles 160*a* and 160*b*. The transfer case 260 may also be operable in a two-wheel drive mode in which the transfer case 260 transmits rotary power to only the second axle 160*b*.

In FIG. 4, the 2WD may be engaged when power is only transmitted to the rear wheels, while the 4WD in FIG. 1 may be engaged when power is distributed to all four wheels, enhancing traction, especially in challenging conditions. When operating in either the 4WD mode or 2WD mode, the WAC ECU 140 may operate to control the actuators using the prediction module such that the WAC ECU 140 or vehicle control system predicts vehicle responses to numerous possible control actions for each actuator depending on the wheels to which power is distributed.

In the WAC system of the shown embodiments, the wheel alignment may be achieved according to an example as follows.

As a vehicle travels across a specific terrain, the wheel and output shaft inputs rotational information to the eLSD (s), which transmits this sensor data and information to an ECU. While transmitting feedback information to the eLSD, the ECU calculates and derives, in conjunction with a prediction module, and also transmits feedback and/or commands to the ACS on each wheel. In response, the ACS then adjusts the camber, toe, and/or caster of the wheel, enabling a maneuver, (typically, a turn) to be executed with greater traction and precision, and thus with greater speed.

Accordingly, first, within the processor of WAC ECU 140, front-left, front-right, rear-left, and rear-right desired wheel-torque distributions may be calculated and determined so that the torque is split to enable each of the drive wheels to spin at different speeds. Thereafter, command signals corresponding to front-left, front-right, rear-left, and rear-right desired wheel-torque distributions calculated are output from the output interface of WAC ECU 140 to eLSD 120*a*, 120*b*, so as to adjust the wheel-torque distributions based on the command signals to adjust the wheel slip.

For instance, the wheel slip may be adjusted to operate within a range to provide an open differential (0%) to a locked differential (100%), as needed. For example, when driving straight down a road, the % of wheel slip may be calculated and determined to be relatively small (approximately 10%-15%) and the amount may decrease when making a lane change or other steering input. When applying the throttle, the % of wheel slip may be calculated and adjusted to be approximately 40%-50%, which may be to a maximum rear traction while cornering. Under extreme lane changes and slalom events, the largest coupling may occur during the most aggressive dynamic maneuvers so that the clutches may nearly lock (100%) to add stability at the optimal time but open back up to allow the vehicle to steer through double lane change at precisely the right times.

Simultaneously with the desired wheel-torque distributions calculated being output from the output interface of WAC ECU 140 to eLSD(s) 120*a*, 120*b*, during the wheel alignment control, the output interface of WAC ECU 140, in conjunction with the prediction module, may generate a command signal via a two-way communication link to an ASC ECU 170, so as to quickly analyze terrain information for example, but not limited to, traction and turning margins and, in response, make adjustments to the camber, toe, and/or caster of each wheel, such that the terrain can be traversed at optimal speed.

Figure 5:
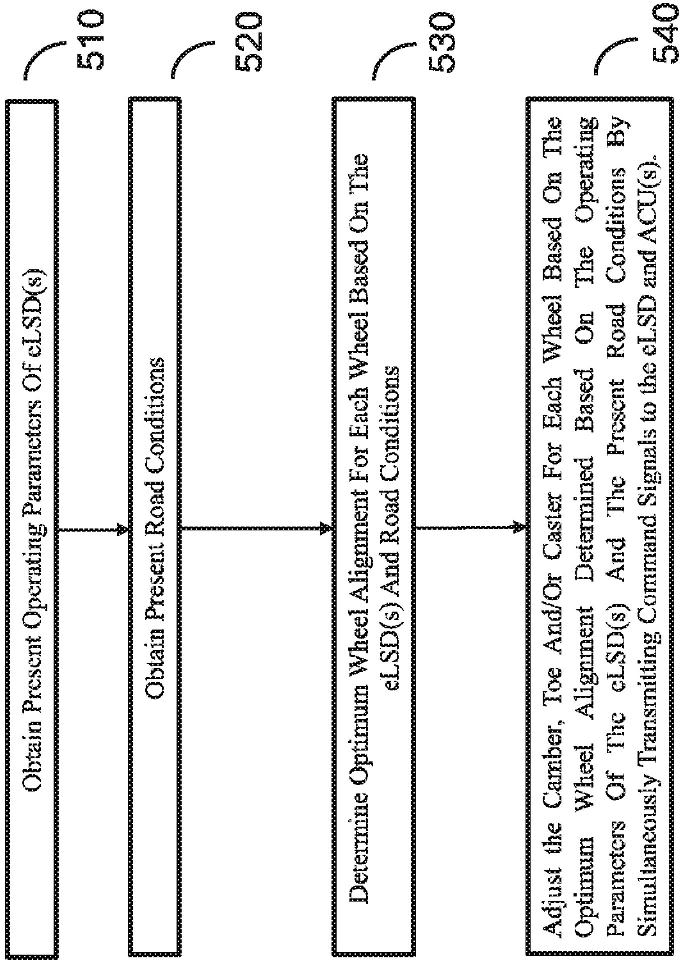
FIG. 5 is a flowchart showing a WAC system control routine executed within an electronic control unit (ECU) incorporated in the vehicle in FIG. 1, according to embodiments of the present disclosure.

FIG. 5 illustrates a flowchart of an example WAC system control routine 500 executed within the processor of the ECU incorporated in the vehicle 100 for wheel alignment adjustment, according to embodiments of the present disclosure. While the example of one wheel is discussed, the control routine of FIG. 5 may be performed (e.g., concurrently, or sequentially) for each wheel having an associated ACS and eLSD.

At step 510, the control routine may obtain the present operating parameters of the eLSD(s) 120*a*, 120*b* from sensor data, such as (but not limited to) wheel speed sensors, torque sensors, throttle position sensors, steering angle sensors, yaw rate sensor (gyroscope sensor), lateral acceleration sensors (G-force sensors), temperature sensors, and hall-effect sensors or magnetic reluctance sensors.

At step 520, the control routine may obtain the present road conditions which may be retrieved from road data sensors, weather conditions sensors or data, a network-connected server, virtual sensors, and/or AI algorithms.

At step 530, the control routine, in conjunction with a prediction module based on the operating parameters of the eLSDs and the present road conditions, may calculate and determine optimum wheel alignment for each wheel.

At step 540, the control routine may adjust the camber, toe and/or caster for each wheel based on the optimum wheel alignment determined based on the operating parameters of the eLSD(s) and the present road conditions. The control routine may simultaneously output the desired wheel-torque distributions to the eLSD(s) and generate and transmit a command signal to an ASC ECU 170 to move the respective actuators to dynamically in real time analyze terrain and vehicle maneuvering information to adjust the camber, toe, and/or caster of each wheel, such that the terrain can be traversed at optimal speed.

Figures 6A, 6B:
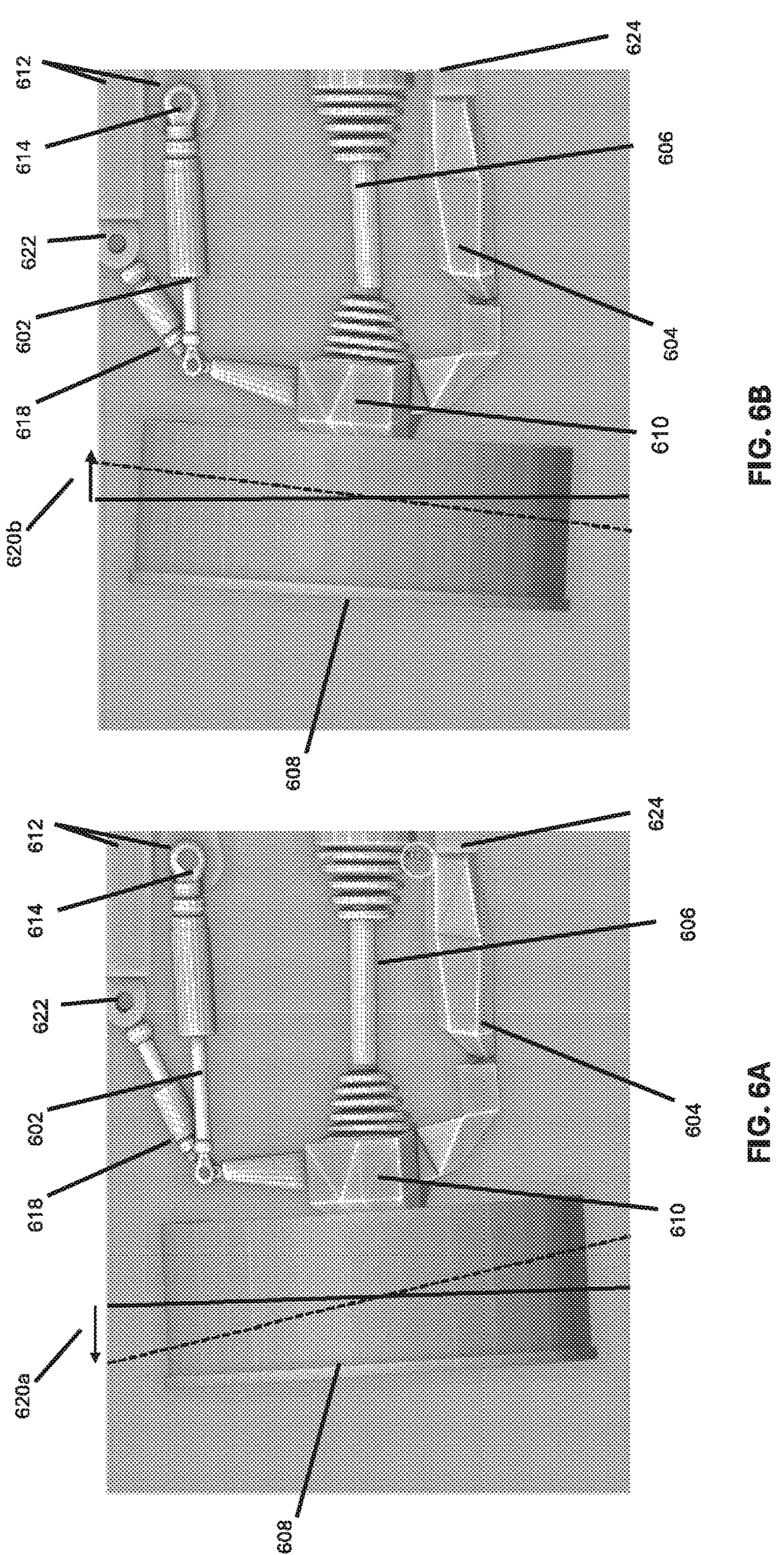
FIGS. 6A-6B illustrate examples of adjusting the camber angle of a wheel, according to embodiments of the present disclosure.

FIGS. 6A-6B illustrate an example of the present system and method that employs an ACS 600 configured as a multi-link suspension in conjunction with WAC system 110 to enhance handling, stability, and ride comfort by allowing independent movement of the wheels. In the example, the multi-link suspension ACS 600 may include an upper control arm 602, a lower control arm 604, and a leading control arm 606 (also referred to as a toe link or a track rod) that control the motion of the wheel 608 in different directions. In an embodiment, the multi-link suspension ACS 600 may be installed on a vehicle as either a front or rear suspension or both; the present disclosure, however, illustrates a rear-right wheel suspension.

In some embodiments, the arms 602, 604, 606 may be the same length. In other embodiments, the arms 602, 604, 606, may not be the same length, in addition, the arms may be angled away from their natural orientation. For example, the lower control arm may be long to provide a good spring lever ratio. The upper arm may be short to provide the proper camber curve. The present system and method may be employed in various suspension configurations, such as a three-link layout, a four-link layout, or a five-link layout. Each arm may include a coupling element, such as a ball joint or rubber bushes at each end.

In the example depicted, the upper control arm 602 may connect the top of a steering knuckle 610 to the upper frame 612 at coupling element 614. The upper control arm 602 may help maintain the camber angle (the tilt of the wheel) during cornering. As shown, the upper control arm 602 may be shorter than the lower control arm 604.

In the shown embodiments, the lower control arm 604 may connect the bottom of the steering knuckle 610 to the lower frame 624 at a coupling element (not shown). In an embodiment, the lower control arm 604 may be an actuator. The lower control arm 604 may be configured to handle the majority of the vertical load and control the wheel's fore-aft movement (caster angle). In embodiments, the lower control arm 604 may be longer than the upper control arm 602.

The leading control arm 606 may be configured as an adjustable link that attaches the wheel 608 to the frame by connecting the steering knuckle to the vehicle's steering rack. The leading control arm 606 may manage the toe angle (the inward or outward pointing of the wheel 608). Adjusting the length of the leading control arm 606 may adjust the toe angle for optimal stability and tire wear. The leading control arm 606 may work with the upper and lower arms to allow multi-directional movement while maintaining suspension geometry. The suspension geometry may include the angles and relationships between the suspension components, such as the control arms, spindles, and steering linkage, which may significantly impact the vehicle's handling, stability, and ride quality. The key angles may include the camber, caster, and toe, which all influence the tire contact and vehicle behavior.

Thus, through control signals and instructions received from the WAC system 110, the multi-link system ACS 600 may automatically adjust the camber, toe, and/or caster angles during suspension movement, keeping the tires aligned for optimal grip, especially during cornering and uneven road conditions. In embodiments, each arm 602, 604, 606 may be configured to pivot independently, allowing the multi-link suspension ACS 600 to adapt to uneven terrain. Through control by the WAC system 110, the multi-link system ACS 600 may dynamically adjust the camber, toe, and/or caster angles by maintaining better contact with the road, improving cornering performance, and reducing tire wear.

In an embodiment, the multi-link system ACS 600 may be configured to be orthogonal such that it may change one parameter at a time within the suspension system without affecting the entire assembly. This is a difference from double wishbone suspension systems where moving a hard point or changing a bushing compliance affects more than one parameter.

As described herein, operating parameters may be calculated and determined in an optimum manner in order to provide the desired suspension properties and desired rolling movements of the motor vehicle. In embodiments, the processor may execute the prediction module. The prediction module may be a software module executed by the processor to predict and compute wheel and/or vehicle responses to numerous possible parameters and conditions based on sensor input. For example, prediction module may receive current operating parameters, such as vehicle speed, wheel speed, lateral acceleration and velocity of the vehicle and road data from the various sensors. Then, based on the sensor input, the prediction module may calculate and derive the suspension properties to achieve an optimal wheel alignment for the camber, toe, and/or caster angle for each wheel.

In an embodiment, the prediction module may employ an algorithm to compute tire forces and calculate suspension member forces. Reaction forces may change during different conditions such as acceleration, breaking, while taking a turn, moving over a bump, etc. The WAC system 110 through the use of the prediction module may collect the vehicle data and the loading condition of the vehicle and output the tire contact point forces resolved to X, Y, and Z directions on all four tires. For example, to find the forces due to a particular suspension member on a joint the axial member force can be resolved in the X, Y, and Z direction by multiplying it with the direction cosines of that force in those axes.

In various embodiments, the multi-link suspension ACS 600 may be configured to be highly adjustable, allowing the upper control arm 602, the lower control arm 604, and the leading control arm 606 to be selectively moved relative to the frame 612, 624 in specified increments, for example, in millimeters. The adjustability of the multi-link suspension ACS 600 provides thousands of instant center multi-link suspension system combinations. For example, in embodiments, the system and method according to the present disclosure may detect camber and caster angles of less than 0.1 degrees accuracy, and toe change to approximately 0.1 mm per wheel and adjust these parameters accordingly in millimeters.

FIGS. 6A-6B illustrate an example that the camber angle may depend on the upper control arm 602 displacement by actuating an actuator 618 that connects to the upper control arm 602 and the frame at coupling element 622. In FIG. 6A, activation of actuator 618 in one direction causes elongation of the upper control arm 602 which moves the wheel 608 outward as indicated by arrow 620*a* generating a positive camber (an increased angle). In FIG. 6B, activation of actuator 618 in the opposite direction causes compression of the upper control arm 602 which moves the wheel 608 inward as indicated by arrow 620*b* generating a negative camber (a decreased angle). In an embodiment, the actuator 618 may be, for example, a worm screw jack or a linear actuator, configured to impart linear motion. In an embodiment, the actuator 618 may be configured to translate rotational motion into linear motion.

While the example of adjusting the camber angle by actuating the upper control arm 602 to adjust the upper portion of the wheel 608 is shown in FIGS. 6A-6B, the present system and method is also applicable to adjusting the toe and caster angles.

In an alternate embodiment, the system and method according to the present disclosure may employ a torque-vectoring system, instead of an eLSD. In such an embodiment, the torque-vectoring system may be configured to operate on the same basic principles regarding an eLSD, as described herein. The torque-vectoring system may operate similarly to the eLSD wherein both aim to improve traction and handling, except that the torque-vectoring system may actively distribute power to individual wheels, while the eLSDs may primarily limit wheel slip. Namely, rather than changing the amount of allowable differential slippage in response to changing road conditions, the torque-vectoring system may use braking to stop a wheel from slipping. The torque-vectoring system can be used to apply the brakes to the wheel that is slipping to help transfer power to the wheel with grip force.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Any of the methods described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components, or sub-steps.

As used herein in the specification and claims, including as used in the examples and unless otherwise expressly specified, all numbers may be read as if prefaced by the word "about" or "approximately," even if the term does not expressly appear. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan.

What is claimed is:

1. A vehicle control system, comprising:

a control unit configured to receive data from a plurality of sensors which monitors an electronic limited slip differential mounted to a vehicle and detects road conditions;

a prediction module executed by a processor to predict, based on electronic limited slip differential data and road condition data received by the control unit, a wheel alignment adjustment for the road conditions that the vehicle approaches and encounters along a road and generate a control signal based on the predicted wheel alignment adjustment; and a wheel alignment adjustment mechanism connected to at least one wheel mounted to the vehicle for automatically adjusting wheel alignment for the at least one wheel in response to the control signal such that at least one of a camber angle, a toe angle, and a caster angle for the at least one wheel is adjusted as the vehicle travels across varying road conditions.

2. The vehicle control system of claim 1, wherein the wheel alignment adjustment mechanism includes at least two telescopic arms with actuators and a control arm associated with the at least one wheel.

3. The vehicle control system of claim 2, wherein movement of the at least two telescopic arms and actuators in a direction with respect to the at least one wheel by the control arm causes the at least one wheel to move and adjust at least one of the camber angle, the toe angle, and the caster angle for the at least one wheel.

4. The vehicle control system of claim 1, wherein the wheel alignment adjustment mechanism is configured to receive the road condition data to dynamically in real time or pre-emptively adjust the wheel alignment prior to the vehicle encountering the varying road conditions.

5. The vehicle control system of claim 1, wherein the prediction module is configured to automatically determine optimal operating parameters for the at least one of the camber angle, the toe angle, and the caster angle, for each of the at least one wheel, individually, in a pair, or a group.

6. The vehicle control system of claim 1, wherein the vehicle is a two-wheel drive vehicle, a four-wheel drive vehicle, or an all-wheel drive vehicle.

7. The vehicle control system of claim 1, wherein the vehicle is configured to operate in in a two-wheel drive mode, a four-wheel drive mode, or switch between the two-wheel drive mode and the four-wheel drive mode.

8. The vehicle control system of claim 1, wherein the processor is communicatively coupled to a memory for storing navigation data, vehicle dynamics data, the road condition data received from a server and wheel data; and wherein the processor is communicatively coupled to a data transceiver to request and receive the road condition data and collect and transmit new road condition data and vehicle location coordinates to the server.

9. The vehicle control system of claim 1, wherein the control unit is configured to derive input from sensor information transmitted by the electronic limited slip differential to enable the wheel alignment adjustment mechanism to dynamically in real time or pre-emptively analyze terrain information including wheel traction and turning margins and, in response to the sensor information, adjust at least one of the camber angle, the toe angle, and the caster angle of each wheel, such that various terrain can be traversed by the vehicle at an optimal speed.

10. The vehicle control system of claim 1, wherein the plurality of sensors include a road data sensor attached to the vehicle to collect information about road surface conditions including detecting a slope of the road, a road curvature, potholes in the road, cracks in the road, uneven pavement in the road, or weather-related hazards associated with the road; and wherein the road data sensor includes at least one of a camera, LiDAR (Light Detection and Ranging), radar, or a sensor designed to measure road surface irregularities.

11. The vehicle control system of claim 1, wherein the control unit is configured to use data from existing sensors mounted on the vehicle as input to a machine learning algorithm to create virtual sensors that determine the road conditions.

12. The vehicle control system of claim 11, wherein the virtual sensor is configured to generate two data layers including a virtual surface data and a virtual vehicle data;

wherein the virtual surface data creates a virtual replica of road segments, the road conditions and road surface reactions to weather conditions; and wherein the virtual vehicle data creates a virtual replica of the at least one wheel mounted to a vehicle chassis system of the vehicle.

13. The vehicle control system of claim 1, wherein the control unit is configured to use data from cameras mounted on the vehicle to capture images of the road and use an artificial intelligence (AI) algorithm to analyze the images of the road to identify, categorize, and train the AI algorithm to identify the road conditions and faults.

14. The vehicle control system of claim 1, wherein the road condition data is obtained from a network-connected server using a data transceiver of the vehicle.

15. The vehicle control system of claim 1, wherein the control unit is configured to generate command signals transmitted to the electronic limited slip differential to adjust a wheel-torque distribution of the at least one wheel to adjust a wheel slip within a pre-determined range based on the road conditions.

16. The vehicle control system of claim 1, wherein the wheel alignment adjustment mechanism includes a multi-link suspension wherein each link automatically pivots independently to adjust at least one of the camber angle, the toe angle, and the caster angle.

17. A vehicle control system, comprising:

a control unit configured to receive data from a plurality of sensors which monitors a torque-vectoring system mounted to a vehicle and detects road conditions;

a prediction module executed by a processor to predict, based on a torque-vectoring system data and road condition data received by the control unit, a wheel alignment adjustment for the road conditions that the vehicle approaches and encounters along a road and generate a control signal based on the predicted wheel alignment adjustment; and a wheel alignment adjustment mechanism connected to at least one wheel mounted to the vehicle for automatically adjusting wheel alignment for the at least one wheel in response to the control signal such that at least one of a camber angle, a toe angle, and a caster angle for the at least one wheel is adjusted as the vehicle travels across varying road conditions.

18. The vehicle control system of claim 17, wherein the wheel alignment adjustment mechanism includes at least two telescopic arms with actuators and a control arm associated with the at least one wheel; and wherein movement of the at least two telescopic arms and actuators in a direction with respect to the at least one wheel by the control arm causes the at least one wheel to move and adjust at least one of the camber angle, the toe angle, and the caster angle for the at least one wheel.

19. A method for controlling wheel alignment adjustments of a vehicle, comprising:

receiving at a control unit data from a plurality of sensors which monitors an electronic limited slip differential mounted to a vehicle and detects road conditions;

predicting using a prediction module, based on electronic limited slip differential data and road condition data received by the control unit, a wheel alignment adjustment for the road conditions that the vehicle approaches and encounters along a road and generating a control signal based on the predicted wheel alignment adjustment; and automatically adjusting, using a wheel alignment adjustment mechanism, wheel alignment for at least one wheel mounted to the vehicle in response to the control signal such that at least one of a camber angle, a toe angle, and a caster angle for the at least one wheel is adjusted as the vehicle travels across varying road conditions.

20. The method of claim 19, wherein the wheel alignment adjustment mechanism includes at least two telescopic arms with actuators and a control arm associated with the at least one wheel; and wherein movement of the at least two telescopic arms and actuators in a direction with respect to the at least one wheel by the control arm causes the at least one wheel to move and adjust at least one of the camber angle, the toe angle, and the caster angle for the at least one wheel.

* * * * *